May 11, 1954  C. H. FAY  2,678,399
MEASUREMENT OF RADIATION ABSORPTION
Filed Dec. 3, 1951
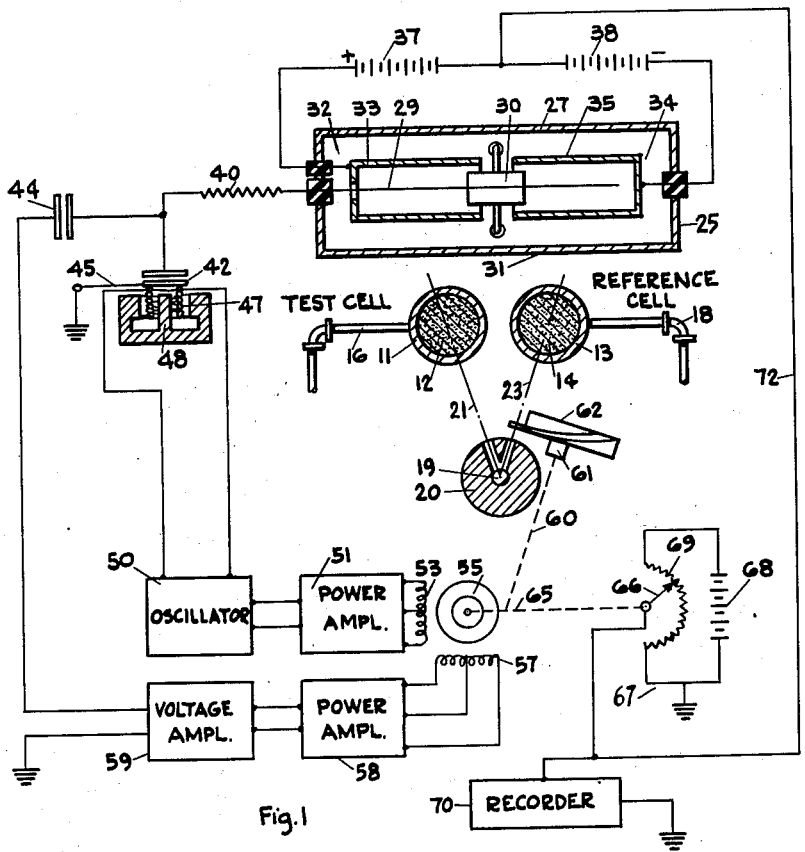
Fig.1
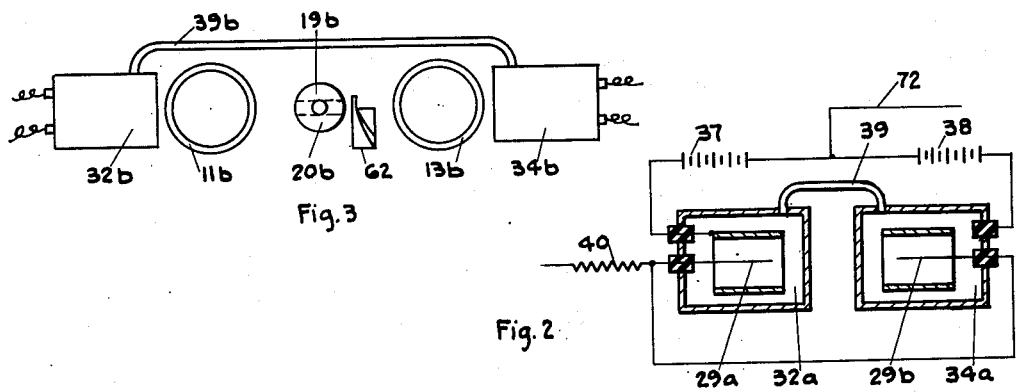
Fig.3
Fig.2
Inventor: Charles H. Fay
By: His Attorney Patented May 11, 1954

2,678,399

UNITED STATES PATENT OFFICE 2,678,399

MEASUREMENT OF RADIATION ABSORPTION

Charles H. Fay, Houston, Tex., assignor to Shell Development Company, Emeryville, Calif., a corporation of Delaware Application December 3, 1951, Serial No. 259,640

5 Claims. (Cl. 250—83.6)

This invention pertains to methods and apparatus for the investigation and determination of the nature, composition, conformation and other characteristics of various bodies or substances by means involving the utilization of radiation absorption effects.

Radiation methods, utilizing either scattering or absorption effects, have already been applied to purposes such as the logging of formations traversed by wells, the determination of the physical condition of various structural members, the measurement of wall thickness of tanks or pipes, etc. These methods, which ordinarily provide an accuracy to within about two percent in the measured radiation intensity, are satisfactory for many purposes. When it is desired, however, to measure much smaller changes in absorption, they are in general inadequate.

When the only absorber is the one whose absorption it is desired to measure, it is often possible to choose a type and hardness of radiation giving easily measurable changes in absorption for the changes in absorber properties it is desired to measure. Frequently, however, it is desired to measure changes in absorption due to changes in absorber properties within thick-walled pipes or other pressure vessels. It is then necessary to use a harder radiation than would otherwise be desirable, and to provide means for measuring much smaller changes in absorption.

Errors in radiation measurement consist of statistical errors, which are inherent and whose effect can be reduced to the desired probable value only by the use of a sufficiently long averaging time, and of instrumental errors, such as those due to changes in detector sensitivity.

It is an object of this invention to provide a method of radiation absorption measurement which, by inherent compensation of instrumental errors, is capable of an accuracy, such as to within about 0.05 of one percent in intensity, sufficient to render it suitable for such purposes as, for example, the measurement of the saturation of porous packs or cores, or the measurement of the density of various media, including that of dust or of fluidized solids suspended in a fluid, particularly where these measurements have to be made through thick-walled pipes or other pressure vessels.

It is a further object of this invention to provide a null method of absorption measurement, wherein changes in absorption in a main radiation beam are balanced by automatically changing the thickness of a measuring absorber which may be positioned either in a comparison beam or in the main beam, the change in density-thickness product of the measuring absorber being a direct measure of the corresponding change in the absorber under investigation.

These and other objects of this invention will be understood from the following description taken in conjunction with the attached drawings, wherein:

Fig. 1 is a diagram of the general arrangement of the present system.

Figs. 2 and 3 show variations of the arrangement of Fig. 1, using dual ionization chambers.

To simplify exposition, the present methods of effecting measurements and the apparatus used therefor will be described with regard to gamma ray absorption measurements as applied for the purpose of determining the degree of saturation of a porous pack or core by a desired fluid, it being understood that such description is purely illustrative and that said method and apparatus are equally well applicable for use with other types of radiation, such as X, or beta radiation for purposes listed hereinabove, as well as for many other purposes which will readily occur to those expert in the art.

Referring to Fig. 1, a cylindrical test cell or holder 11 contains the porous pack or core 12 whose saturation by a fluid it is desired to measure. It is understood that holder 11 and pack or core 12 may represent a relatively short section of a longer holder and pack or core, namely, the section at which the saturation measurement is desired. Saturation measurements may be desired, for example, during the course of flow experiments in which the desired liquid and a gas are flowed at varying ratios through pack or core 12 by means of pipes diagrammatically indicated at 16.

Flow experiments of the type contemplated can be and are usually started from 100 percent liquid saturation, so that this calibration point is available. At high pressures, where the gas density is significant, some means of determining the zero liquid saturation point, which cannot be reached in the flow experiment, is desirable. This can be done, as will be hereinafter explained, by comparing the absorption of the test cell and its contents with that of a reference cell 13, preferably identical in material, diameter, and wall thickness to cell 11, containing a similar pack or core 14 equal in porosity to pack or core 12, and provided with means diagrammatically shown at 18 for flowing the gas only through pack or core 14. In applications not requiring such comparison, the only function of cell 13 or of any similar cell used in its place is to balance the absorption of cell 11 and its contents to within the range of the present automatic balancing system, as explained hereinbelow.

A source of gamma rays 19 is housed in lead shielding 20 provided with two ports defining two gamma ray beam paths, the axes of which are indicated at 21 and 23. Any suitable, preferably concentrated, source of gamma rays, including radium, cobalt 60, or cesium 137, may be used, the last-named being the most favorable of the three where the total absorber density-thickness product is not extreme. The cells 11 and 13 are positioned so as respectively to intercept the beams whose axes are 21 and 23, each transmitted beam entering one section of a dual ionization chamber 25.

The dual ionization chamber 25 comprises an outer gas tight envelope 27, sufficiently strong to seal pressures such as 2000 p. s. i. therein, and filled to a desired pressure with a suitable gas, such for example as argon. Positioned within the chamber are an axial collector electrode 29, passing through a central partitioning cylinder 30, held within the chamber on insulating pins 31, and two annular outer potential electrodes, 33 and 35, symmetrically surrounding equal portions of electrode 29 longitudinally of each other on either side of the cylinder 30. A source of potential, which may comprise two separate units 37 and 38 arranged in series, is connected so as to apply a desired positive voltage, such for example as 2000 volts to the annular electrode 33, and an equal negative voltage to the other annular electrode 35. The central electrode 29, which is near zero or ground potential, is therefore negative with regard to electrode 33 and positive with regard to electrode 35, serving as a cathode in the first case and as an anode in the second. It may thus be said that the chamber 25 actually consists of two substantially identical chambers 32 and 34, arranged so that no current will flow to or from the electrode 29 if the ionizations in said two chambers are equal.

Although the dual chamber 25 of Fig. 1 is preferred according to the present invention when permitted by the dimensions of cell 11, it is understood that it may be readily replaced by two separate chambers having equal volumes and maintained at the same pressure by a pipe or tubing connection 39, said chambers having separate inner axial electrodes 29a and 29b, as diagrammatically shown in Fig. 2. When the test cell is very large in diameter, it is preferred to place a source 19b between cells 11b and 13b, with separate chambers 32b and 34b at the ends of the array, as shown in Fig. 3.

A decoupling resistance 40 is connected on one side to the terminal of electrode 29, and on the other side to one of the plates of capacitors 42 and 44, in parallel. The other plate of capacitor 42 is grounded through a leaf spring 45 which resiliently supports this plate. This plate also carries a moving coil element 47 similar to that of a dynamic loudspeaker, operating in the air gap of a loudspeaker type permanent magnet 48, and carrying the output current of an oscillator 50. It is preferred that oscillator 50 be designed to employ the combination of elements 42, 45, 47, 48 as the equivalent tuned circuit determining the oscillator frequency, by virtue of the motional impedance of the combination, reaching its maximum at its mechanical resonance frequency, which may be of an order such as 100 to 300 cycles per second.

The output of oscillator 50 is also delivered, through a power amplifier 51, to one of the windings 53 of a reversible two-phase induction servo-motor 55, whose other winding 57 is fed by the output of a power amplifier 58 and voltage amplifier 59, whose input is in turn connected to the resistor 40 through the condenser 44. The servo-motor 55 drives through any suitable mechanical linkage or transmission means diagrammatically indicated at 60 and 61, a wedge or mask member 62 which is preferably a metallic disc-shaped member having a peripheral thickness varying linearly with angle. Rotation of the wedge 62 about its axis 61 by the motor 55 thus results in a greater or smaller amount of the material forming the wedge, such as aluminum, being interposed along the path 23, whereby the total amount of gamma rays permitted to pass through the cell 13 and to arrive at the ionization chamber is decreased or increased; wedge 62 being designed to provide the desired range in density-thickness product.

It is obvious that instead of being interposed between the source 20 and the cell 13, as shown, mask or wedge 62 may be interposed between the source and the cell 11.

By means of a second mechanical linkage schematically indicated at 65, the motor 55 drives also the sliding contact 66 of a potentiometer 67 comprising a source of potential 68 and a resistance 69, whereby a variable voltage is supplied to the recorder 70 for recording purposes, and is also applied, through lead 72, as a compensating feedback voltage to the ionization chamber 25. The two transmissions 60 and 65 are fixed or locked with regard to each other so that the recorder actually records the motion of the wedge 62. The recorder itself may be of any desired commercial type, for example, one where the position of the wedge 62 is traced by a pen on a chart actuated by a time-responsive clock mechanism.

The operation of the system will be clear from the above description. When the system is first set into operation, the ionization currents in chambers 32 and 34 are in general unequal, so that the collector electrode 29 begins to acquire a charge of a sign and at a rate dependent on the sense and magnitude of the unbalance. A portion of this charge is transferred to capacitor 42 through decoupling resistor 40. The mechanical variation of the capacitance of capacitor 42 creates an alternating potential proportional to this charge, which potential is coupled to voltage amplifier 59 by condenser 44. This potential after amplification by voltage amplifier 59 and power amplifier 58 is delivered to the control winding 57 of motor 55. Meanwhile the reference winding 53 is supplied alternating current of the same frequency and constant amplitude from oscillator 50 via power amplifier 51. The amplifiers are so phased as to cause motor 55 to rotate in the direction tending to balance the system by changing the thickness of circular wedge 62 interposed in beam 23 in the direction required for equalizing the ionization currents in chambers 32 and 34. The actual motion or position of wedge 62 necessary for rebalancing the system is recorded by the recorder 70 through the potentiometer 67, whose sliding contact 66 is driven by the transmission train 65 locked with the transmission train 60.

The potentiometer 67, besides supplying the necessary voltage to operate the recorder, provides also a feedback voltage which is essential to stabilize the system, as will be clear from the following considerations. The error or output current, $\Delta i$, to or from the inner electrodes 29 of the ionization chamber, is actually the difference between the ionic flow in chamber 32 and chamber 34. This current must charge both capacitors 42 and 44 and also the capacity of the ionization chamber itself to a potential $e$. As the wedge 62 moves to rebalance the system, $\Delta i$ starts to decrease, but $e$, which rises at the time integral of the current, continues to increase, although at a slower rate. Thus the voltage $e$ tends to reach its maximum at a time when $\Delta i$ reaches zero, that is, at a time when the system needs no further compensation. Since, however, it is the quantity $e$ which controls the rotation of the wedge, it is obvious that the system would in such case badly overshoot itself as it would be providing compensation at a maximum rate when no compensation is needed. It has been found, however, that by applying a feedback voltage from the potentiometer 67 to annular electrodes 33 and 35 through lead 72 and potential sources 37 and 38, the system can be stabilized. This is due to the fact that, because of capacitance coupling between electrodes 33 and 35 and electrode 29, the above feedback renders a component or portion of the potential $e$ proportional to the position of wedge 62, the remainder being as before proportional to the time integral of that position, and the lag in response is therefore reduced.

If the ionization currents in chambers 32 and 34 can be equalized at any position of wedge 62, the latter will then come to rest, except for small diversions due to fluctuations, at that position. If the system does not balance within the range of the wedge, it is obvious that by introducing suitable fixed absorbers in the appropriate beam, the system can be adjusted to balance within that range, and indeed at the wedge thickness desired in the light of the anticipated changes in absorption to be measured. For example, in the instance of saturation measurement incorporating a reference cell for gas density compensation previously referred to, the system should be adjusted to balance near the minimum wedge thickness when no liquid is present in cell 11, leaving nearly the entire range of wedge thickness to balance the additional absorption when liquid is present.

It is clear that the addition of equal absorbers in paths 21 and 23, corresponding to the situation when the common pressure of the common gas in cells 11 and 13 is increased, will not affect the balance condition, so that the position of wedge 62, and the corresponding deflection recorded by recorder 70, will be independent of gas density for zero liquid saturation. It is also evident that the relation between liquid saturation and recorded wedge position is linear, so that determination of the 100% liquid saturation point at a given pressure suffices, in conjunction with the fixed zero saturation point, to calibrate the recorder in saturation.

The method of comparing the response of two ionization chambers herein disclosed is superior to methods which compare potentials developed across individual load resistors for each chamber: in the present invention electrical leakage from the common collector does not affect the balance point, while in the latter methods a change in load resistance of one chamber, which for the high resistance necessarily employed may readily be caused by leakage, obviously introduces error. It is evident that the disclosed system provides the usual advantages of null systems of measurement, the balance point being independent of reasonable changes in oscillator amplitude, amplifier gain, the common gas pressure of the ionization chambers, and the like. The result is an improvement in stability and useful sensitivity. The balance point is also independent of source strength, so that corrections for source decay are not required.

As stated hereinabove, the present invention has been described with regard to the use of gamma rays only by way of illustration. It will be understood by those familiar with the art that the invention can be readily adapted for use with other types of radiation, such as X or beta radiation, the changes required for this purpose residing chiefly in system constants, such primarily as the material and the wall thickness of the cells 11 and 13, wedge 62, and chamber 27, and in the type and pressure of gas used in the latter.

I claim as my invention:

1. A system for nuclear radiation absorption measurement, comprising ionization chamber means having inner electrode means, first and second outer electrodes arranged around the inner electrode means longitudinally of each other, one of the outer electrodes being positive and the other negative with regard to the inner electrode means, a source disposed to direct nuclear radiation to the two outer electrodes along two distinct paths, a holder containing a material under test interposed in one of said paths, a movable mask member of varying thickness disposed near said source, motor means mechanically linked to the mask member to move said mask member into and out of one of said paths of radiation, means comprising a control circuit having its input capacitatively coupled to the output of the ionization chamber means and its output connected to the input of the motor means for energizing said motor to move the mask member in such a direction as to decrease the output of the ionization chamber means, and recorder means actuated by the motor means for recording the position of the mask member.

2. A system for nuclear absorption measurement, comprising ionization chamber means having inner electrode means, first and second outer electrodes arranged around the inner electrode means longitudinally of each other, one of said outer electrodes being positive and the other negative with regard to the inner electrode means, a source disposed to direct nuclear radiation to the two outer electrodes along two distinct paths, a holder containing a material under test interposed in one of said paths, a movable mask member of varying thickness disposed near said source, motor means mechanically linked to the mask member to move said mask member into and out of one of said paths of radiation, a control circuit connected between the output of the ionization chamber means and the input of the motor means, said control circuit comprising a capacitor system connected to the inner electrode means and having at least one resiliently supported movable plate element, means comprising an oscillator coupled to said movable plate element for continuously varying the capacity of said capacitor system by oscillating said movable plate element at a constant frequency, amplifier means having their input connected to said capacitor system and their output connected to the input of the motor means for energizing said motor means to move the mask member in such a direction as to decrease the output of the ionization chamber means, and recorder means actuated by the motor means for recording the position of the mask member.

3. A system for nuclear absorption measurement, comprising ionization chamber means having inner electrode means, first and second outer electrodes arranged around the inner electrode means longitudinally of each other, one of said outer electrodes being positive and the other negative with regard to the inner electrode means, a source disposed to direct nuclear radiation to the two outer electrodes along two distinct paths, a holder containing a material under test interposed in one of said paths, a movable mask member of varying thickness disposed near said source, motor means having two phase windings mechanically linked to the mask member to move said mask member into and out of one of said paths of radiation, a control circuit connected between the output of the ionization chamber means and the input of the motor means, said control circuit comprising a capacitor having one fixed plate element connected to the inner electrode means and one resiliently supported movable plate element, means comprising an oscillator coupled to the movable plate element for continuously oscillating said movable plate element at a constant frequency to vary the capacity of said capacitor, amplifier means connected between the oscillator means and one of said phase windings to apply thereto the output current of said oscillator, a second capacitor having one plate connected to the inner electrode in parallel with the fixed plate of the first capacitor, second amplifier means connected between the other plate of the second capacitor and the second phase winding to apply to said second phase winding the output current of the inner electrode passed by the second capacitor, whereby said motor means are energized to move the mask member in such a direction as to decrease the output current of the inner electrode, and recorder means actuated by the motor means for recording the position of the mask member.

4. A system for gamma ray absorption measurement comprising ionization chamber means having inner electrode means, first and second outer electrodes arranged about said inner electrode means longitudinally of each other, a source of voltage having its positive terminal connected to one outer electrode and its negative terminal connected to the other outer electrode, said inner electrode means being substantially at zero potential with regard to said outer electrodes, a source of gamma rays disposed to irradiate said chamber, a holder containing a reference material interposed in the path of said rays to one of said outer electrodes, a holder containing a material under test interposed in the path of said rays to the other outer electrode, a movable mask member of uniformly varying thickness disposed near said source of gamma rays, a motor mechanically linked to said mask member to move said mask member into and out of one of said paths of rays to vary the relative amounts of gamma rays reaching said outer electrodes, a control circuit comprising a first capacitor having one plate connected to the inner electrode means, a second capacitor having a fixed plate connected in parallel with said plate of the first capacitor to the inner electrode means and a movable plate, means comprising an oscillator coupled to said movable plate to vary the capacity of the system formed by the two capacitors by oscillating the movable plate at a constant frequency, amplifier means having their input connected to the other plate of the first capacitor and their output connected to the input of said motor for applying thereto the current of the inner electrode means passed by the first electrode, and recorder means actuated by said motor for recording the position of the mask member.

5. A system for gamma ray absorption measurement, comprising an ionization chamber containing a single inner electrode, first and second annular electrodes arranged about said inner electrode longitudinally of each other, voltage source means having a positive terminal connected to one annular electrode and a negative terminal connected to the other annular electrode, said inner electrode being substantially at ground potential with regard to said annular electrodes, a source of gamma rays disposed to irradiate said chamber, a holder containing a reference material interposed in the path of said rays to one of the annular electrodes in said chamber, a holder containing a material under test interposed in the path of said rays to the other annular electrode, a movable mask member of uniformly varying thickness disposed near said source of gamma rays, a motor having two phase windings, and a control system for said motor, said control system comprising a first capacitor having a fixed plate connected to said inner electrode, and a second resiliently supported grounded plate, means comprising a constant frequency oscillator electromagnetically coupled with said grounded plate to oscillate said plate with regard to the first plate, an amplifier having its input connected to the output of said oscillator and its input connected to one of the phase windings of said motor; a second capacitor having one of its plates connected to said inner electrode in parallel with the fixed plate of said first capacitor, amplifier means connected to the other plate of said second capacitor, the output of said amplifier means being connected to the second phase winding of said motor, potentiometer means having a sliding contact connected to the mid-point of the voltage source energizing said ionization chamber, mechanical drive means coupling said motor in fixed relationship to said movable mask member and to said sliding contact member, whereby said mask member is moved by said motor into and out of one of said paths of gamma ray in such a manner as to decrease the output current of said inner electrode means while a compensating feedback voltage is simultaneously applied to said annular electrodes by said sliding potentiometer contact, and recorder means energized by said potentiometer means for recording the position of said mask member.

References Cited in the file of this patent

UNITED STATES PATENTS

| Number | Name | Date |
|---|---|---|
| 2,394,703 | Lipson | Feb. 12, 1946 |
| 2,467,812 | Clapp | Apr. 19, 1949 |
| 2,480,808 | Fearon | Aug. 30, 1949 |
| 2,586,303 | Clarke | Feb. 19, 1952 |